(12) United States Patent
Chen et al.

(10) Patent No.: US 12,518,208 B2
(45) Date of Patent: Jan. 6, 2026

(54) KNOWLEDGE GRAPH PRE-TRAINING METHOD BASED ON STRUCTURAL CONTEXT INFORMATION

(71) Applicant: ZHEJIANG UNIVERSITY, Hangzhou (CN)

(72) Inventors: Huajun Chen, Hangzhou (CN); Wen Zhang, Hangzhou (CN); Ganqiang Ye, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 371 days.

(21) Appl. No.: 17/791,897

(22) PCT Filed: Sep. 6, 2021

(86) PCT No.: PCT/CN2021/116769
§ 371 (c)(1),
(2) Date: Jul. 9, 2022

(87) PCT Pub. No.: WO2022/057669
PCT Pub. Date: Mar. 24, 2022

(65) Prior Publication Data
US 2024/0177047 A1 May 30, 2024

(30) Foreign Application Priority Data

Sep. 16, 2020 (CN) .......................... 202010975552.X

(51) Int. Cl.
*G06N 20/00* (2019.01)
*G06F 16/36* (2019.01)
(Continued)

(52) U.S. Cl.
CPC ............. *G06N 20/00* (2019.01); *G06F 16/36* (2019.01); *G06F 16/367* (2019.01); *G06F 40/30* (2020.01); *G06N 5/022* (2013.01)

(58) Field of Classification Search
CPC ........ G06F 16/36; G06F 16/367; G06F 40/30; G06N 3/08; G06N 20/00; G06N 5/22
(Continued)

(56) References Cited

U.S. PATENT DOCUMENTS

| | | | | |
|---|---|---|---|---|
| 2018/0082183 | A1* | 3/2018 | Hertz | ................ G06F 16/9024 |
| 2020/0073996 | A1* | 3/2020 | Wright | ................ G06F 16/313 |
| 2021/0216887 | A1* | 7/2021 | Yu | .......................... G06N 5/022 |

FOREIGN PATENT DOCUMENTS

| | | |
|---|---|---|
| CN | 111198950 | 5/2020 |
| CN | 111444721 | 7/2020 |
| CN | 111626063 | 9/2020 |

\* cited by examiner

*Primary Examiner* — Shahid A Alam
(74) *Attorney, Agent, or Firm* — Jiwen Chen; Joywin IP Law PLLC

(57) ABSTRACT

Disclosed in the present invention is a knowledge graph pre-training method based on structural context information, the method comprising: for a target triple, constructing an instance comprising context triples, and adopting a triple integration module to encode each of the context triples in the instance to obtain an integration vector; combining the integration vectors for all context triples in the instance into a context vector sequence, and adopting a structural information module to encode the context vector sequence to obtain a structural representation vector for the triple; adopting a general task module to calculate the structural representation vector for the triple, and obtaining a label prediction value for the triples, updating the structural representation vector for the triple based on cross-entropy loss of the label prediction value for the triple and a label truth value for the triple until the completion of the training, so as to obtain an optimized structural representation vector (Continued)

for the target triple. The structural representation vector for the triple obtained by this method incorporates the context information.

9 Claims, 3 Drawing Sheets

(51) Int. Cl.
*G06F 40/30* (2020.01)
*G06N 5/022* (2023.01)

(58) Field of Classification Search
USPC .............................................. 707/12; 706/12
See application file for complete search history.

KNOWLEDGE GRAPH PRE-TRAINING METHOD BASED ON STRUCTURAL CONTEXT INFORMATION

This is a U.S. national stage application of PCT Application No. PCT/CN2021/116769 under 35 U.S.C. 371, filed Sep. 6, 2021 in Chinese, claiming priority of Chinese Application No. 202010975552.X, filed Sep. 16, 2020, all of which are hereby incorporated by reference.

TECHNICAL FIELD

The present invention belongs to the technical field of data storage and processing, and in particular relates to a knowledge graph pre-training method based on structural context information.

BACKGROUND TECHNOLOGY

A Knowledge Graph can be regarded as a directed labeled graph, and the facts in the graph are represented as triples in a form of (head entity, relation, tail entity), which is abbreviated as (h, r, t) according to the English initials. In recent years, the knowledge graph has developed rapidly in both construction and application, and has broad application prospects in artificial intelligence fields such as semantic search, information extraction, and question answering.

Since a graph structure in the knowledge graph contains a large amount of valuable information, it is crucial to extract deep structural information for various knowledge graph tasks, such as entity typing, link prediction, entity alignment, etc. A representation learning method embeds entities and relations into a continuous vector space, can automatically extract structural features, and derive new triples through algebraic operations. This method was first proposed by a TransE model, which effectively simplifies mathematical operations in the knowledge graph. After that, a TransH model proposes that an entity has different representations under different relations to overcome the limitations of a multi-relation problem; a TransR model introduces a relation-specific space to solve the multi-relation problem. A TransD model decomposes a projection matrix into a product of two vectors, which further improves the performance of various tasks in the knowledge graph.

For a variety of different knowledge graph specific tasks such as entity classification, entity alignment, link prediction, and recommendation, different representation learning methods have been proposed in previous studies to adapt to different knowledge graph training tasks.

In the field of natural language processing, pre-training language models such as Bert have achieved significant improvements in a variety of downstream tasks of natural language processing. The main differences between the pre-training language model and the knowledge graph representation learning model lie in the following two points: one is that language representation is sequence data, and word context is used as key information to detect the semantics of words and sentences, while knowledge graph representation is structural graph data. The second is that the input of the downstream task of the pre-training language model can be unified into two sentences, while the input of the knowledge graph is a triple. Therefore, the main challenges facing the pre-training knowledge graph representation learning models that adapt to different tasks are that: (1) regardless of the specific knowledge graph downstream tasks, the pre-training model should be able to automatically capture deep structural context information of a given triple; (2) the representation of entities and relations needs to be trained in different ways according to different downstream tasks and different structural features of the input data of downstream tasks to improve their robustness.

The combination of the knowledge graph and the pre-training language model has attracted more and more attention of researchers. A K-Bert model injects knowledge from the knowledge graph into sentences to generate knowledge-rich language representations. A KG-Bert model uses a pre-trained language model to complement the knowledge graph, and an ERNIE model integrates an entity representation in a knowledge module into a semantic module to enhance text representation capabilities. KEPLER incorporates the structural information of the knowledge graph into the text representation vector of the entity. A KnowBert model proposes a knowledge-enhancing representation method, which aligns entities in sentences with entities in the knowledge graph, and fuses the vector representations of the two to improve the effect of prediction tasks.

SUMMARY OF THE INVENTION

The object of the present invention is to provide a knowledge graph pre-training method based on structural context information. A structural representation vector of a triple obtained by the knowledge graph pre-training method is combined with context information. With the only need of being trained once in a pre-training stage, in a fine-tuning stage, the training can be completed more quickly and better experimental results can be achieved in various downstream tasks of the knowledge graph.

In order to realize the above-mentioned purpose of the present invention, the following technical solutions are provided in the present invention:

A knowledge graph pre-training method based on structural context information, wherein a pre-training model comprising a triple integration module, a structural information module and a general task module is adopted to train the triples in the knowledge graph, and the specific training process thereof comprises:

for a target triple, constructing an instance comprising context triples, and adopting the triple integration module to encode each of the context triples in the instance to obtain an integration vector;

combining integration vectors for all context triples in the instance into a context vector sequence, and adopting the structural information module to encode the context vector sequence to obtain a structural representation vector for the triple;

adopting the general task module to calculate the structural representation vector for the triple, and obtaining a label prediction value for the triple, and updating parameters of the triple integration module, parameters of the structural information module, parameters of the general task module, and the structural representation vector for the triple based on cross-entropy loss of the label prediction value for the triple and a label truth value for the triple until the completion of the training, so as to obtain an optimized structural representation vector for the target triple.

Preferably, adopting a Transformer model in the triple integration module, assigning a triple tag [TRI] to each of the context triples, and combining the triple tag representation $k_{[TRI]}$ and a head entity representation h', a tail entity representation r', and a relation representation t' of the respective context triple into a representation sequence $<k_{[TRI]}, h', r', t'>$ as an input of the triple integration module, which is calculated by the triple integration module and an output corresponding to the triple tag $k_{[TRI]}$ is the integration vector.

Preferably, adopting a Transformer model in the structural information module, representing the context vector sequence as $<seq_h, seq_r, seq_t>$, where, $seq_h, seq_r, seq_t$ are the sequences for the context triples of a head entity and a tail entity respectively, and the specific form is:

$$seq_h = <c_h^i, i \in [1,n]>$$

$$seq_r = <c_r^i, i \in [1,n]>$$

$$seq_t = <c_t^i, i \in [1,n]>$$

wherein, $c_h^i$ represents an ith integration vector of the head entity h, and similarly, $c_r^i$ represents an ith integration vector of the relation r, and $c_t^i$ represents an ith integration vector of the tail entity t.

assigning a head entity tag [HEA], a relation tag [REL], a tail entity tag [TAI] for $seq_h$, $seq_r$, $seq_t$, and combining the $seq_h$, $seq_r$, $seq_t$ and a head entity tag vector $k_{[HEA]}$, a relation tag vector $k_{[REL]}$, and a tail entity tag vector $k_{[TAI]}$ into a sequence $<k_{[HEA]}, Seq_h, k_{[REL]}, seq_r, k_{[TAI]}, seq_t>$ as an input of the structural information module.

Preferably, a segment representation type to which the integration vector of each of the context triples belongs is added for each of the context triples, i.e., $$\bar{c}_h = c_h + s_h$$

$$\bar{c}_r = c_r + s_r$$

$$\bar{c}_t = c_t + s_t$$

wherein, $s_h$ represents a segment vector of the head entity, and similarly, $s_r$ represents a segment vector of the relation, and $s_t$ represents a segment vector of the tail entity;

then the sequences $\widehat{seq}_h$, $\widehat{seq}_r$, $\widehat{seq}_t$ of the context triples with the segment representation type added are represented as:

$$\widehat{seq}_h = <\bar{c}_h^i, i \in [1,n]>$$

$$\widehat{seq}_r = <\bar{c}_r^i, i \in [1,n]>$$

$$\widehat{seq}_t = <\bar{c}_t^i, i \in [1,n]>$$

then a sequence inputted into the structural information module is:

$$<k_{[HEA]}, \widehat{seq}_h, k_{[REL]}, \widehat{seq}_r, k_{[TAI]}, \widehat{seq}_t>.$$

Preferably, the general task module comprises at least one fully connected layer and softmax layer, and the fully connected layer is used to perform fully connected settlement on an input sequence to obtain deep context information of the target triple, and softmax layer is used to calculate the label prediction value of the deep context information.

Wherein, the instance for the target triple comprises positive instances and negative instances, and the number of the positive instances and the number of the negative instances is guaranteed to be the same, and a construction method thereof comprises: constructing the positive instances based on a context triple sequence for the target triple, obtaining a new triple by replacing the head entity, relation, or tail entity of the target triple, and constructing the negative instances by using a context triple sequence for the new triple, wherein the label truth value of the target triple is 1 and a label truth value of the new triple is 0.

Preferably, the instance size of the target triple is fixed to be n, that is, each instance contains n context triples, and during construction, if the number of the context triples is greater than n, n context triples are randomly selected from the context triples to form an instance, otherwise, zeros are directly filled after all context triples so that the number of the context triples is made up to n.

When training for a specific task, the optimized structural representation vector for the triple serves as an input of a specific task module, and parameter fine-tuning is performed on the specific task module by using the optimized structural representation vector for the triple.

Compared with the prior art, the beneficial effects of the present invention at least comprise the followings:

The present invention can automatically encode the depth graph structure by using the structural context triples, and dynamically obtain the structural information of entities and relations; meanwhile, it has good experimental results for various downstream tasks of the knowledge graph. Moreover, after a pre-training, it can quickly achieve better test indexes for downstream tasks of a variety of knowledge graphs.

BRIEF DESCRIPTION OF DRAWINGS

In order to illustrate the embodiments of the present invention or the technical solutions in the prior art more clearly, the following briefly introduces the accompanying drawings used in the description of the embodiments or the prior art. Obviously, the drawings in the following description are only some embodiments of the present invention. For those of ordinary skill in the art, other drawings can also be obtained from these drawings without creative efforts.

DETAILED DESCRIPTION OF THE EMBODIMENTS

In order to make the objects, technical solutions and advantages of the present invention clearer, the present invention will be further described in detail below with reference to the accompanying drawings and embodiments. It should be understood that the specific embodiments described herein are only used to explain the present invention, and do not limit the protection scope of the present invention.

A knowledge graph pre-training provided in an embodiment based on structural context information adopts a pre-training model comprising a triple integration module, a structural information module and a general task module to train triples in the knowledge graph, and the specific training process thereof comprises:

Step 1, adopting the triple integration module to encode each of context triples to obtain an integration vector.

Since the pre-training model needs to capture various deep-level structural information in an integration knowledge graph, the input of the model comprises not only target triples (h, r, t), but also the sequences of structural context triples of these target triples, i.e., and sequences of neighbor triples of h, r and t, denoted as C(h), C(r) and C(t).

For a given target triple τ(h, r, t), the triple integration module (Triple Module, T-Mod) first encodes each context triple c=(h', r', t')∈{C(h), C(h), C(h)} as a vector c, so we have $$c = T\_Mod(<h',r',t'>)$$

Among them, <h', r', t'> represents a sequence of vectors h', r', t', T_Mod( ) represents an encoding result of the input data by the triple integration module. Specifically, the triple integration module based on a Transformer model is widely used due to its good performance and parallel computing architecture.

Figure 1:
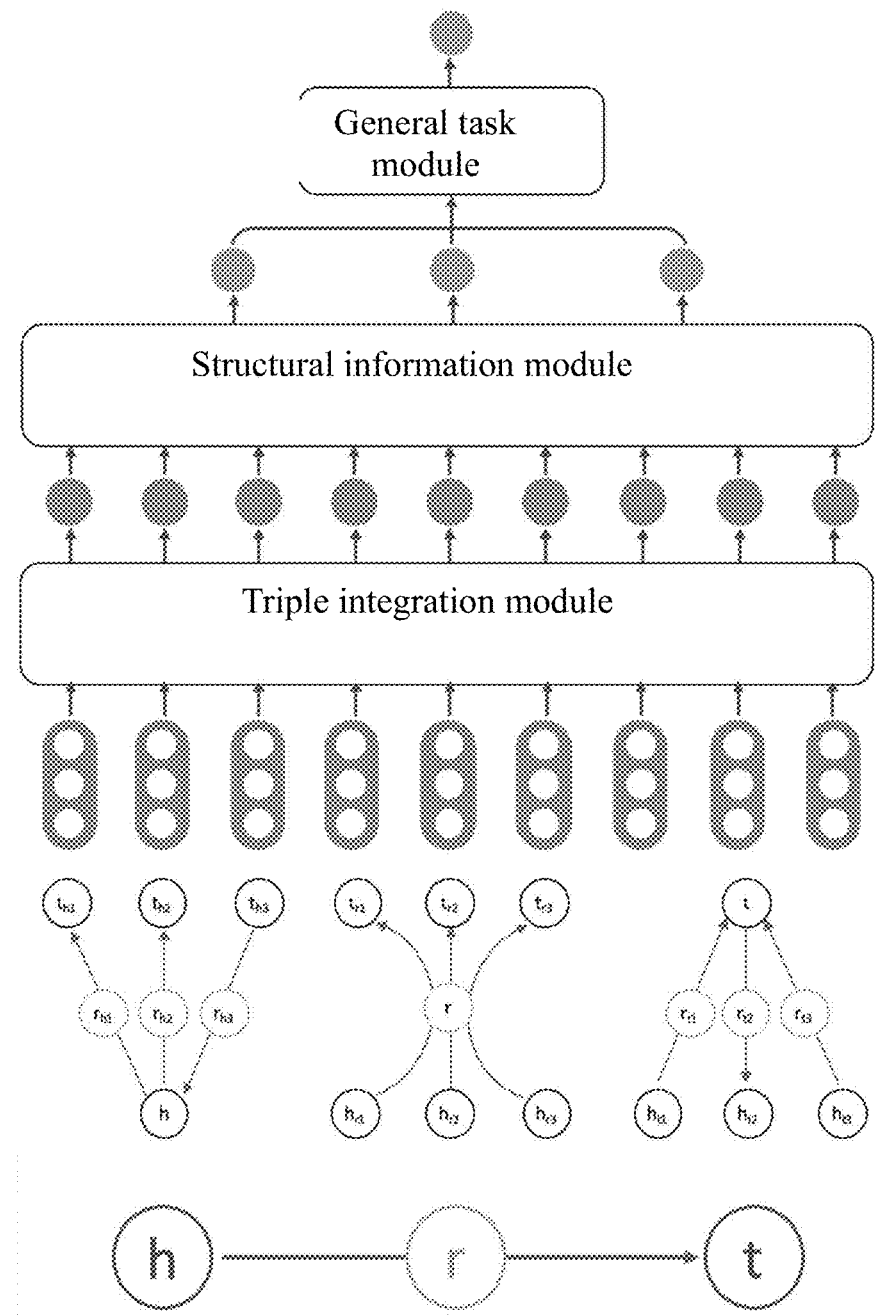
FIG. 1 is a schematic structural diagram of a pre-training model provided by an embodiment.
Figure 2:
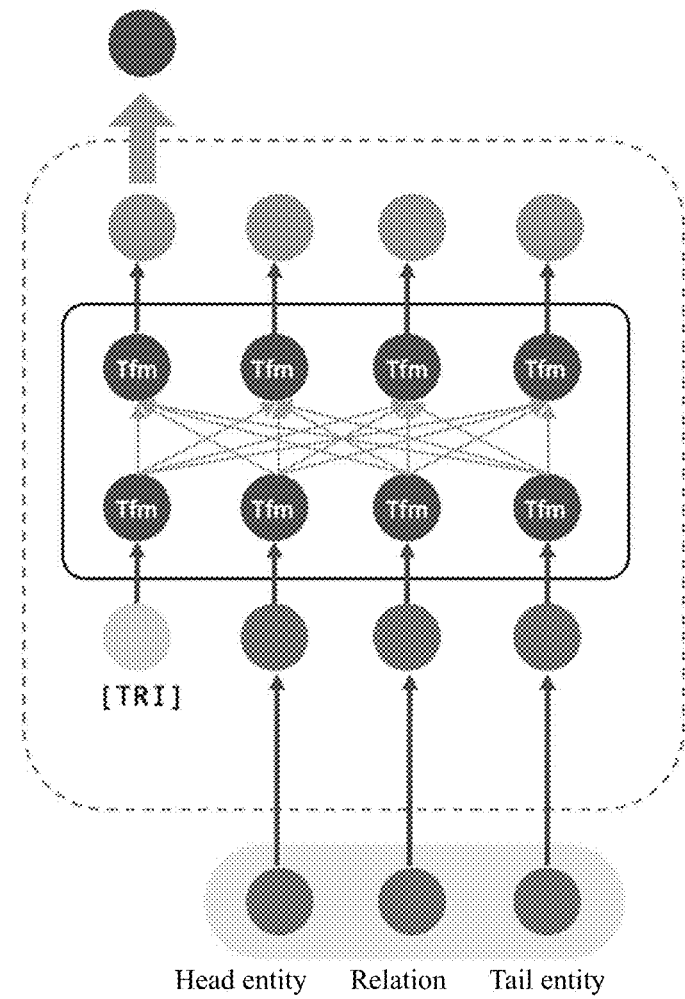
FIG. 2 is a schematic structural diagram of a triple integration module provided by an embodiment.

As shown in FIG. 2, before the triple <h', r', t'> is input into the Transformer model, a triple tag [TRI] for integrating the triple needs to be introduced in front of <h', r', t'>, and it is a vector c after the integration. This triple tag [TRI] is assigned a triple tag vector, denoted as $k_{[TRI]} \in \mathbb{R}^d$. Therefore, the combined sequence $<k_{[TRI]}, h', r', t'>$ is input into a multi-layer bidirectional Transformer encoder, and after encoding by the multi-layer bidirectional Transformer encoder, the output corresponding to the triple tag [TRI] is used as the integration vector.

In this embodiment, all context triples are encoded and calculated in parallel by a unified triple integration module to obtain the integration vectors.

Step 2, adopting the structural information module to encode context vector sequence comprised of the integration vectors of all the context triples to obtain a structural representation vector of the triple.

Figure 3:
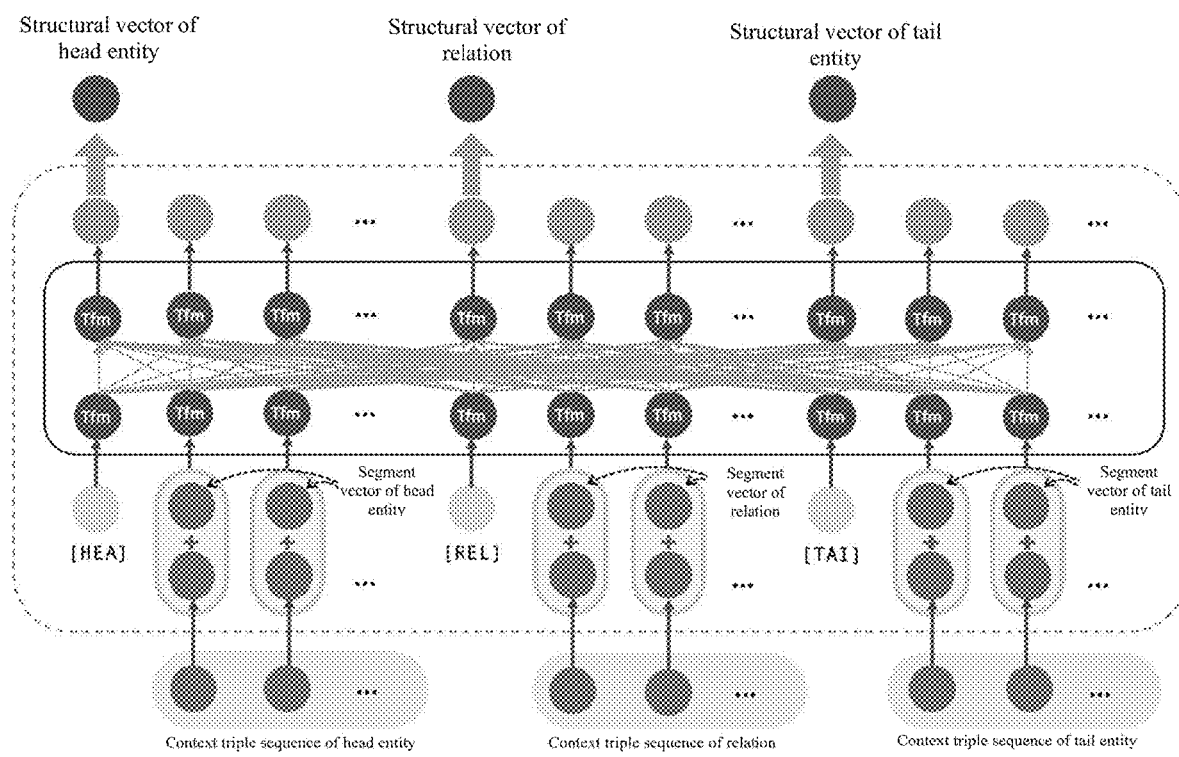
FIG. 3 is a schematic structural diagram of a structural information module provided by an embodiment.

As shown in FIG. 3, the structural information module (Structure Module, S-Mod) takes context triple representations of h, r, t as inputs, and the corresponding outputs can be represented by $h_s$, $r_s$ and $t_s$ respectively, so the framework of the S-Mod can be expressed as:

$$h_s, r_s, t_s = S\_Mod(<seq_h, seq_r, seq_t>)$$

Where $seq_h$, $seq_r$, $seq_t$ is sequences of context triples for h, r, t and the specific form is as the following:

$$seq_h = <c_h^i, i \in [1,n]>$$

$$seq_r = <c_r^i, i \in [1,n]>$$

$$seq_t = <c_t^i, i \in [1,n]>$$

wherein, $c_h^i$ represents an ith integration vector of the head entity h, and similarly, $c_r^i$ represents an ith integration vector of the relation r, and $c_t^i$ represents an ith integration vector of the tail entity t.

In order to enhance the independence of different elements used for training in the target triple τ, a segment representation type to which each triple representation belongs is added to each triple representation, indicating whether it belongs to a head entity h, a relation r or a tail entity t, which are respectively represented as $s_h$, $s_r$ and $s_t$, then the integration vector representation with the segment representation type it belongs to is added as:

$$\bar{c}_h = c_h + s_h$$

$$\bar{c}_r = c_r + s_r$$

$$\bar{c}_t = c_t + s_t$$

Then the sequences $\widehat{seq}_h$, $\widehat{seq}_r$, $\widehat{seq}_t$ of the context triples with the segment representation type added are represented as:

$$\widehat{seq}_h = <\bar{c}_h^i, i \in [1,n]>$$

$$\widehat{seq}_r = <\bar{c}_r^i, i \in [1,n]>$$

$$\widehat{seq}_t = <\bar{c}_t^i, i \in [1,n]>$$

After adding a segment vector, in order to further distinguish the element to which the current context triple belongs, three triple tags [HEA], [REL] and [TAI] similar to the triple integration module are introduced. Adding [HEA] in front of the first head entity context triple, adding [REL] in front of the first relation context triple, and adding [TAI] in front of the first tail entity context triple, then their corresponding vector representations are $k_{[HEA]}$, $k_{[REL]}$ and $k_{[TAI]}$. Therefore, the format of the input sequence can also be expressed as:

$$i = <k_{[HEA]}, \widehat{seq}_h, k_{[REL]}, \widehat{seq}_r, k_{[TAI]}, \widehat{seq}_t>$$

The structural information module encodes the input sequence i using a multi-layer bidirectional Transformer encoder that is different from the setting of the triple integration module. From the last layer of the Transformer, the outputs $h_s$, $r_s$ and $t_s$ corresponding to the positions [HEA], [REL] and [TAI] are represented as the structural representation vectors of the head entity h, the relation r and the tail entity t respectively, constituting the structural representation vector of the triple.

In order for the model to have the ability to dynamically generate context representations of the entities and relations, the structural vector $h_s$ in the model not only depends on its own structural context triples, but also on the context triples of r and t. The same goes for structural vectors $r_s$ and $t_s$. Therefore, even for the same entity or the same relation in different target triples at the input, the structural vectors obtained after the structural information module are different.

Step 3, adopting the general task module to calculate the structural representation vector of the triple to obtain a label prediction value of the triple.

The three structural representation vectors $h_s$, $r_s$ and $t_s$ are input into the general task module (tasK Module, K-Mod), and deep context information $v_\tau$ of the target triple τ=(h, r, t) is integration through a simple fully connected neural network:

$$v_\tau = [h_s; r_s; t_s] W_{int} + b$$

wherein, $[h_s; r_s; t_s]$ represents a verctor after the splicing of $h_s$, $r_s$, $t_s$, $W_{int} \in \mathbb{R}^{3d \times d}$ is the weight, while $b \in \mathbb{R}^d$ is a deviation vector.

Adopting a softmax layer to obtain the label prediction value $s_\tau$ based on deep context information $v_\tau$:

$$s_\tau = f(h,r,t) = \mathrm{softmax}(v_\tau W_{cls})$$

wherein, $W_{cls} \in \mathbb{R}^{d \times 2}$ is the weight of a classification vector, $s_\tau \in \mathbb{R}^2$ is a two-dimensional real vector. After the softmax operation, there is a relation of $s_{\tau_0} + s_{\tau_1} = 1$, $\tau_0$ indicates that the label is a correct triple, and $\tau_1$ represents that the label is a wrong triple.

Step 4, updating parameters of the triple integration module, parameters of the structural information module, parameters of the general task module, and the structural representation vector for the triple based on cross-entropy loss of the label prediction value for the triple and a label truth value for the triple until the completion of the training, so as to obtain an optimized structural representation vector for the target triple.

Given the correspondingly constructed set $\mathbb{D}^+$ of positive instances of the triple and set $\mathbb{D}^-$ of negative instances of the triple, the cross-entropy loss can be calculated by combining $s_\tau$ and triple labels:

$$\mathcal{L} = \sum_{\tau \in \mathbb{D}^+ \cup \mathbb{D}^-} \left( y_\tau \log(s_{\tau_1}) + (1 - y_\tau) \log(s_{\tau_1}) \right)$$

wherein, $y_\tau \in \{0,1\}$ is the label of the triple $\tau$, when $\tau \in \mathbb{D}^+$, when the label $y_\tau$ is 1, and when $\tau \in \mathbb{D}^-$, when the label $y_\tau$ is 0. The set $\mathbb{D}^-$ of triple negative instances is generated by replacing the head entity h or tail entity t with another random entity $e \in \varepsilon$, or replacing the relation r with another random relation $r' \in \mathcal{R}$.

When generating training instances for each target triple, the number of positive and negative instances needs to be kept the same. Constructing the positive instances based on a context triple sequence for the target triple, obtaining a new triple by replacing the head entity, relation, or tail entity of the target triple, and constructing the negative instances by using context triples for the new triple.

The following rules are defined in this embodiment to replace an element of the target triple: for the head entity h or tail entity t, they are replaced by a random entity $e \in \varepsilon$, and similarly, the relation r is replaced by a random relation $r' \in \mathcal{R}$ or a relation connected to h or t, and the probabilities of replacing both relations are set to be equal.

In the above knowledge graph pre-training method based on structural context information, the length of the context triple sequence in the instance needs to be fixed. The number of context triples based on the head entity h, relation r or tail entity t varies widely, from zero to several hundreds. That is to say, some entities are rich in neighbor triples, while some have almost no adjacent neighbor triple. Therefore, when generating entities, the sequence length must be aligned with a specified size n to ensure that the model works correctly. To this end, the rules are defined as follows: if the number of the context triples is greater than the specified size n, a context sequence with a fixed sequence length is randomly selected from the context triples, otherwise the context triples will be directly padded with zeros to meet the above requirements.

In the above knowledge graph pre-training method based on structural context information, in order to make the context triples contain the deep structural information of the knowledge graph as comprehensively as possible, the sequence length of the context triples should be set as long as possible. However, because the training time and space complexity of the Transformer model is quadratic of the sequence, the longer the sequence is, the more time-consuming it takes to train and the higher the training cost.

To balance the conflict between the two, the distribution of the lengths of context triples for entities and relations is analyzed. Specifically, in WN18RR, 20 context triples can cover 96.28% of entities and relations, while if 99% are to be covered, 115 context triples are required, and the marginal benefit is rapidly diminishing. Therefore, setting the length of the context triples for h, r or t to 20, plus taking into account the extra labels [HEA], [REL] and [TAI], the length of the input sequence to the pre-training model is set to 64. Similarly, in the dataset FB15k-237, 128 is chosen as the length of the input sequence.

For simplicity, the number of layers and heads of Self-Attention in the Transformer model are denoted as L and A, respectively, and the hidden number of dimensions of the representation vector is denoted as H. In the triple integration module (T-Mod), there are the following configurations: L=6, A=3 and H=768, and in the structural information module (S-Mod), L=12, A=12 and H=768. We set a learning rate to 2e-4 and a batch size to 64.

When training for a specific task, in downstream tasks, model inputs and intermediate processing are appropriately adjusted for different downstream tasks. For example, for the task of entity alignment, it is only necessary to input two entities and the structural triple sequence information of these two entities, and use the data set of entity alignment to train and fine-tune some parameters of each module, and finally obtain a complete set of models suitable for the entity alignment task. This makes the model have very good experimental results on various downstream tasks.

The pre-training model of the knowledge graph mainly focuses on the field of the knowledge graph, and draws on the idea of pre-training language model. It only needs to train the complete knowledge graph once and extract the structural context information from it, and then in the fine-tuning stage, it can improve the effect of various knowledge graph downstream tasks including link prediction, entity alignment, etc., and can also perform better in some downstream tasks combined with natural language processing datasets, including relation extraction, entity links, Knowledge Q&A, etc. In addition, compared with other specific downstream task models, it can be more competitive in terms of training time and training parameters for these tasks. It is precisely because of this that the entire knowledge graph pre-training model has stronger versatility, robustness and generalization ability.

The above-mentioned specific embodiments describe in detail the technical solutions and beneficial effects of the present invention. It should be understood that the above-mentioned embodiments are only the most preferred embodiments of the present invention, and are not intended to limit the present invention. Any modifications, additions and equivalent substitutions made within the scope of the principle of the present invention shall be included within the protection scope of the present invention.

The invention claimed is:

1. A computer-implemented knowledge graph pre-training method based on structural context information, wherein a pre-training model comprising a triple integration module, a structural information module and a general task module is adopted to train triples in the knowledge graph, and the specific training process thereof comprises:
   for a target triple, constructing an instance comprising context triples from the knowledge graph, and adopting the triple integration module to encode each of the context triples in the instance to obtain an integration vector;
   combining integration vectors for all context triples in the instance into a context vector sequence, and adopting the structural information module to encode the context vector sequence to obtain a structural representation vector for the triple;

adopting the general task module to calculate the structural representation vector for the triple, and obtaining a label prediction value for the triple, and updating parameters of the triple integration module, parameters of the structural information module, parameters of the general task module, and the structural representation vector for the triple based on cross-entropy loss of the label prediction value for the triple and a label truth value for the triple until the completion of the training, so as to obtain an optimized structural representation vector for the target triple;

assigning a triple tag [TRI] to each of the context triples, and combining the triple tag representation $k_{[TRI]}$ and a head entity representation h', a tail entity representation r', and a relation representation t' of the respective context triple into a representation sequence <$k_{[TRI]}$, h', r', t'> as an input of the triple integration module, which is calculated by the triple integration module and an output corresponding to the triple tag $k_{[TRI]}$ is the integration vector;

representing the context vector sequence as <$seq_h$, $seq_r$, $seq_t$>, where, $seq_h$, $seq_r$, $seq_t$ are the sequences for the context triples of a head entity h, a relation r, and a tail entity t respectively, and the specific form is:

$seq_h = <c_h^i, i \in [1,n]>$ $seq_r = <c_r^i, i \in [1,n]>$ $seq_t = <c_t^i, i \in [1,n]>$ wherein, $c_h^i$ represents an i integration vector of the head entity h, $c_r^i$ represents an i integration vector of the relation r, and $c_t^i$ represents an i integration vector of the tail entity t; and assigning a head entity tag [HEA], a relation tag [REL], a tail entity tag [TAI] for $seq_h$, $seq_r$, $seq_t$, and combining the $seq_h$, $seq_r$, $seq_t$ and a head entity tag vector $k_{[HEA]}$, a relation tag vector $k_{[REL]}$, and a tail entity tag vector $k_{[TAI]}$ into a sequence <$k_{[HEA]}$, $seq_h$, $k_{[REL]}$, $seq_r$, $k_{[TAI]}$, $seq_t$> as an input of the structural information module.

2. The computer-implemented knowledge graph pre-training method based on structural context information according to claim 1, wherein the triple integration module adopts a Transformer model.

3. The computer-implemented knowledge graph pre-training method based on structural context information according to claim 1, wherein a segment representation type to which the integration vector of each of the context triples belongs is added for each of the context triples, i.e., $\bar{c}_h = c_h + s_h$ $\bar{c}_r = c_r + s_r$ $\bar{c}_t = c_t + s_t$ wherein, $c_h$ represents an integration vector of the head entity h, $c_r$ represents an integration vector of the relation r, and $c_t$ represents an integration vector of the tail entity t; $s_h$ represents a segment vector of the head entity, $s_r$ represents a segment vector of the relation, and $s_t$ represents a segment vector of the tail entity;

then the sequences $\widehat{seq}_h$, $\widehat{seq}_r$, $\widehat{seq}_t$ of the context triples with the segment representation type added are represented as:

$\widehat{seq}_h = <\bar{c}_h^i, i \in [1,n]>$ $\widehat{seq}_r = <\bar{c}_r^i, i \in [1,n]>$ $\widehat{seq}_t = <\bar{c}_t^i, i \in [1,n]>$ then a sequence inputted into the structural information module is:

<$k_{[HEA]}$, $\widehat{seq}_h$, $k_{[REL]}$, $\widehat{seq}_r$, $k_{[TAI]}$, $\widehat{seq}_t$>.

4. The computer-implemented knowledge graph pre-training method based on structural context information according to claim 1, wherein the structural information module adopts a Transformer model.

5. The computer-implemented knowledge graph pre-training method based on structural context information according to claim 1, wherein the general task module comprises at least one fully connected layer and softmax layer, and the fully connected layer is used to perform fully connected settlement on an input sequence to obtain deep context information of the target triple, and softmax layer is used to calculate the label prediction value of the deep context information.

6. The computer-implemented knowledge graph pre-training method based on structural context information according to claim 1, wherein the instance for the target triple comprises positive instances and negative instances, and the number of the positive instances and the number of the negative instances is guaranteed to be the same, and a construction method thereof comprises: constructing the positive instances based on a context triple sequence for the target triple, obtaining a new triple by replacing the head entity, relation, or tail entity of the target triple, and constructing the negative instances by using a context triple sequence for the new triple, wherein the label truth value of the target triple is 1 and a label truth value of the new triple is 0.

7. The computer-implemented knowledge graph pre-training method based on structural context information according to claim 1, wherein the instance size of the target triple is fixed to be n, that is, each instance contains n context triples, and during construction, if the number of the context triples is greater than n, n context triples are randomly selected from the context triples to form an instance, otherwise, zeros are directly filled after all context triples so that the number of the context triples is made up to n.

8. The computer-implemented knowledge graph pre-training method based on structural context information according to claim 1, wherein when training for a specific task, the optimized structural representation vector for the triple serves as an input of a specific task module, and parameter trimming is performed on the specific task module by using the optimized structural representation vector for the triple.

9. A computer-implemented knowledge graph pre-training method based on structural context information, wherein a pre-training model comprising a triple integration module, a structural information module and a general task module is adopted to train triples in the knowledge graph, and the specific training process thereof comprises:

for a target triple, constructing an instance comprising context triples from the knowledge graph, and adopting the triple integration module to encode each of the context triples in the instance to obtain an integration vector;

combining integration vectors for all context triples in the instance into a context vector sequence, and adopting the structural information module to encode the context vector sequence to obtain a structural representation vector for the triple;

adopting the general task module to calculate the structural representation vector for the triple, and obtaining a label prediction value for the triple, and updating parameters of the triple integration module, parameters of the structural information module, parameters of the general task module, and the structural representation vector for the triple based on cross-entropy loss of the label prediction value for the triple and a label truth value for the triple until the completion of the training, so as to obtain an optimized structural representation vector for the target triple;

assigning a triple tag [TRI] to each of the context triples, and combining the triple tag representation $k_{[TRI]}$ and a head entity representation h', a tail entity representation r', and a relation representation t' of the respective context triple into a representation sequence $<k_{[TRI]}$, h', r', t'$ as an input of the triple integration module, which is calculated by the triple integration module and an output corresponding to the triple tag $k_{[TRI]}$ is the integration vector;

representing the context vector sequence as $<seq_h, seq_r, seq_t>$, where, $seq_h$, $seq_r$, $seq_t$ are the sequences for the context triples of a head entity h, a relation r, and a tail entity t respectively, and the specific form is:

$seq_h = <c_h^i, i \in [1,n]>$ $seq_r = <c_r^i, i \in [1,n]>$ $seq_t = <c_t^i, i \in [1,n]>$ wherein, $c_h^i$ represents an i integration vector of the head entity h, $c_r^i$ represents an i integration vector of the relation r, and $c_t^i$ represents an i integration vector of the tail entity t; and assigning a head entity tag [HEA], a relation tag [REL], a tail entity tag [TAI] for $seq_h$, $seq_r$, $seq_t$, and combining the $seq_h$, $seq_r$, $seq_t$ and a head entity tag vector $k_{[HEA]}$, a relation tag vector $k_{[REL]}$, and a tail entity tag vector $k_{[TAI]}$ into a sequence $<k_{[HEA]}, seq_h, k_{[REL]}, seq_r, k_{[TAI]}, seq_t>$ as an input of the structural information module;

wherein the triple integration module adopts a Transformer model;

wherein a segment representation type to which the integration vector of each of the context triples belongs is added for each of the context triples, i.e., $\bar{c}_h = c_h + s_h$ $\bar{c}_r = c_r + s_r$ $\bar{c}_t = c_t + s_t$ wherein, $c_h$ represents an integration vector of the head entity h, $c_r$ represents an integration vector of the relation r, and $c_t$ represents an integration vector of the tail entity t; $s_h$ represents a segment vector of the head entity, $s_r$ represents a segment vector of the relation, and $s_t$ represents a segment vector of the tail entity;

then the sequences $\widehat{seq}_h$, $\widehat{seq}_r$, $\widehat{seq}_t$ of the context triples with the segment representation type added are represented as:

$\widehat{seq}_h = <\bar{c}_h^i, i \in [1,n]>$ $\widehat{seq}_r = <\bar{c}_r^i, i \in [1,n]>$ $\widehat{seq}_t = <\bar{c}_t^i, i \in [1,n]>$ then a sequence inputted into the structural information module is:

$<k_{[HEA]}, \widehat{seq}_h, k_{[REL]}, \widehat{seq}_r, k_{[TAI]}, \widehat{seq}_t>$;

wherein the structural information module adopts a Transformer model;

wherein the general task module comprises at least one fully connected layer and softmax layer, and the fully connected layer is used to perform fully connected settlement on an input sequence to obtain deep context information of the target triple, and softmax layer is used to calculate the label prediction value of the deep context information;

wherein the instance for the target triple comprises positive instances and negative instances, and the number of the positive instances and the number of the negative instances is guaranteed to be the same, and a construction method thereof comprises: constructing the positive instances based on a context triple sequence for the target triple, obtaining a new triple by replacing the head entity, relation, or tail entity of the target triple, and constructing the negative instances by using a context triple sequence for the new triple, wherein the label truth value of the target triple is 1 and a label truth value of the new triple is 0;

wherein the instance size of the target triple is fixed to be n, that is, each instance contains n context triples, and during construction, if the number of the context triples is greater than n, n context triples are randomly selected from the context triples to form an instance, otherwise, zeros are directly filled after all context triples so that the number of the context triples is made up to n; and wherein when training for a specific task, the optimized structural representation vector for the triple serves as an input of a specific task module, and parameter trimming is performed on the specific task module by using the optimized structural representation vector for the triple.

* * * * *